US006308386B1

United States Patent
Cooper

(10) Patent No.: US 6,308,386 B1
(45) Date of Patent: *Oct. 30, 2001

(54) FASTENER CLIP AND METHOD OF MAKING THE SAME

(75) Inventor: William J. Cooper, Woonsocket, RI (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/464,022

(22) Filed: Dec. 15, 1999

Related U.S. Application Data

(63) Continuation-in-part of application No. 09/416,784, filed on Oct. 13, 1999, now Pat. No. 6,173,836, which is a continuation-in-part of application No. 09/116,008, filed on Jul. 15, 1998, now Pat. No. 6,129,206.

(51) Int. Cl.⁷ .............................. A44B 9/00; B65D 85/24; G09F 3/12
(52) U.S. Cl. .................... 24/704.1; 24/16 PB; 24/704.2; 24/711.1; 24/DIG. 11
(58) Field of Search .............................. 24/16 PB, 704.1, 24/704.2, 456, 527, 711.1, 72.7, DIG. 11

(56) References Cited

U.S. PATENT DOCUMENTS

| | | |
|---|---|---|
| Re. 32,332 | 1/1987 | Kato . |
| Re. 34,891 | 4/1995 | Kunreuther . |
| 1,832,239 * | 11/1931 | Pedersen .......................... 24/DIG. 11 |
| 1,840,604 * | 1/1932 | Randall ............................ 24/DIG. 11 |
| 1,990,637 * | 2/1935 | Daller .............................. 24/DIG. 11 |
| 3,192,591 * | 7/1965 | Cherrin ............................ 24/DIG. 11 |
| 3,315,325 * | 4/1967 | Cornelius ......................... 24/DIG. 11 |
| 3,323,182 * | 6/1967 | Brickner .......................... 24/DIG. 11 |
| 3,733,657 | 5/1973 | Lankton . |
| 3,850,297 | 11/1974 | Merser . |
| 4,240,183 | 12/1980 | Sumimoto et al. . |
| 4,347,932 | 9/1982 | Furutu . |
| 4,456,123 | 6/1984 | Russell . |
| 4,533,076 | 8/1985 | Bourque . |
| 4,534,464 | 8/1985 | Lankton . |
| 4,586,609 | 5/1986 | Won . |
| 4,654,935 | 4/1987 | Bone . |
| 4,660,718 | 4/1987 | Kato et al. . |
| 4,712,677 | 12/1987 | Russell . |
| 4,901,854 | 2/1990 | Bone et al. . |
| 5,268,183 | 12/1993 | Garza . |
| 5,321,872 * | 6/1994 | Merser ................................ 24/704.1 |
| 5,463,799 * | 11/1995 | Graham ................................ 24/704.1 |
| 5,518,162 | 5/1996 | Deschenes et al. . |
| 5,575,713 | 11/1996 | Benoit et al. . |
| 5,593,033 | 1/1997 | Kunreuther . |
| 5,622,257 | 4/1997 | Deschenes et al. . |
| 5,799,375 | 9/1998 | Fukami . |
| 5,958,525 | 9/1999 | Green et al. . |

* cited by examiner

Primary Examiner—Victor N. Sakran
(74) Attorney, Agent, or Firm—Kriegsman & Kriegsman

(57) ABSTRACT

A unitary plastic fastener clip comprising a plurality of individual fasteners which are disposed in a substantially parallel, side-by-side, spaced relationship. Each fastener comprises an elongated flexible filament having a first enlarged end and a second enlarged end. In one embodiment, each of the first enlarged end and the second enlarged end is a substantially cylindrical transverse bar. In another embodiment, the first enlarged end is a transverse bar of non-uniform transverse cross-section and the second enlarged end is a generally knob-shaped head. A first connector post connects the first enlarged end of the first fastener to the first enlarged end of the second fastener at the approximate midpoints of their mutually-opposing sides. A second connector post connects the second enlarged end of the first fastener to the second enlarged end of the second fastener at the approximate midpoints of their mutually-opposing sides. The fastener clip further includes an elongated runner bar and a plurality of connective necks. Each connective neck is formed onto the runner bar and includes a first end of reduced cross-sectional area which is formed onto the first enlarged end of an associated fastener. The fastener clip is preferably constructed through a process of injection molding.

20 Claims, 5 Drawing Sheets

FASTENER CLIP AND METHOD OF MAKING THE SAME

CROSS-REFERENCE TO RELATED APPLICATIONS

The present application is a continuation-in-part of U.S. patent application Ser. No. 09/416,784, inventor William J. Cooper, filed Oct. 13, 1999, U.S. Pat. No. 6,173,836, the disclosure of which is incorporated herein by reference, which, in turn, is a continuation-in-part of U.S. patent application Ser. No. 09/116,008, inventor William J. Cooper, filed Jul. 15, 1998, U.S. Pat. No. 6,129,206 the disclosure of which is incorporated herein by reference.

BACKGROUND OF THE INVENTION

The present invention relates generally to fastener clips and more particularly to a novel fastener clip and to a method of making said novel fastener clip.

Plastic fasteners are well known in the art and are commonly used to couple together two or more objects. For example, plastic fasteners have been used to attach merchandise tags to articles of commerce, to couple or to re-couple a button to an article of clothing, to last together shoe uppers, and the like.

Plastic fasteners typically comprise a flexible filament having a first enlargement at one end thereof and a second enlargement at the opposite end thereof. In one common type of plastic fastener (see, for example, FIG. 1 of U.S. Pat. No. 5,321,872, which patent is incorporated herein by reference), the first enlargement has the shape of a transverse bar and the second enlargement has the shape of a paddle or the shape of a second transverse bar, the transverse bar and the paddle (or second transverse bar) extending in planes parallel to one another. In another common type of plastic fastener (see, for example, U.S. Pat. No. 3,494,004, which patent is incorporated by reference), the first enlargement has the shape of a transverse bar and the second enlargement has the shape of a knob or pin head. In still another common type of plastic fastener (see, for example, U.S. Pat. No. 4,240,183, which patent is incorporated herein by reference), the first enlargement has the shape of a transverse bar or the shape of a plug and the second enlargement has the shape of a socket, said socket being adapted to receive said transverse bar or said plug.

Plastic fasteners of the various types described above are typically molded as parts of a unitary fastener clip. An example of such a fastener clip is disclosed in U.S. Pat. No. 3,733,657, which patent is incorporated herein by reference. The clip of the aforementioned '657 patent includes a plurality of fasteners, each of said fasteners comprising a flexible filament having a transverse bar (or "cross-bar") at one end thereof and a paddle or a second transverse bar (or "cross-bar") at the opposite end thereof, the transverse bar and the paddle (or second transverse bar) of each fastener extending in planes parallel to one another. The fasteners are arranged relative to one another so that the respective transverse bars are spaced apart and oriented side-by-side and parallel to one another and so that the respective paddles (or second transverse bars) are spaced apart and oriented side-by-side and parallel to one another. The clip of the foregoing '657 patent also includes a runner bar, said runner bar extending perpendicularly relative to the respective transverse bars and being connected to each of the transverse bars by a severable connector. The clip of said '657 patent further includes a severable member interconnecting each pair of adjacent paddles (or second transverse bars).

Other examples of fastener clips that comprise one or more runner bars interconnecting plastic fasteners include U.S. Pat. Nos. 5,622,257, 4,901,854, 5,799,375, and U.S. Reissue Pat. No. 34,891, all of which are incorporated herein by reference.

Fastener clips of the type described above which comprise a runner bar suffer from certain disadvantages. For example, a runner bar can significantly increase the overall size of a fastener clip, thereby rendering packaging and general handling of the fastener clip more cumbersome. In addition, severed connectors previously used to connect fasteners to a runner bar and still remaining on the runner bar after the fasteners have been detached therefrom often have an acute end which may undesirably snag on and damage merchandise when fasteners from the fastener clip are dispensed into such merchandise with a conventional fastener dispensing tool. Furthermore, the number of fasteners that can be molded into a clip of the type having a runner bar is typically limited by the molding process used to create the fastener clip.

For at least the above reasons, a number of runner bar-less fastener clips, assemblies or stock have been fashioned. For example, in U.S. Pat. No. 4,039,078, inventor Bone, which issued Aug. 2, 1977, and which is incorporated herein by reference, there is disclosed fastener attachment stock to be separated or divided, e.g., by cutting, severing, rupturing or shearing, to provide a plurality of fasteners each preferably having a substantially H shape. The stock in its most preferred form includes two undivided elongated and continuous plastic side members having a plurality of plastic cross links coupled to and between each of said side members, each of the links being preferably spaced equidistantly apart from each other.

Fastener stock related to that disclosed in U.S. Pat. No. 4,039,078 is disclosed in U.S. Pat. No. 4,456,123, inventor Russell, which issued Jun. 26, 1984, and which is incorporated herein by reference. The fastener stock of U.S. Pat. No. 4,456,123 differs from that of U.S. Pat. No. 4,039,078 in that, in U.S. Pat. No. 4,456,123, the filament has a substantially D-shaped cross-section and provides draft on surfaces extending from the plane to facilitate removal from the mold. Also, the side members are reduced in cross-sectional area between individual fasteners to provide severable connectors to facilitate separation. The connectors join the end-bars of adjacent fasteners end-to-end at a portion of their periphery, preferably having a flat face at said plane extending from said plane on either the same side as the filaments or the opposite side thereof. Preferably, they extend from the same side and the joined end-bars are substantially D-shaped. Where the connectors extend from the opposite side, the section thereof is preferably continued across the joined end-bars to provide a more rounded cross-section for feeding through circular needle bores.

As can be seen, in each of U.S. Pat. Nos. 4,039,078 and 4,456,123, the enlargements of adjacent fasteners are oriented in an end-to-end relationship. In contrast, in U.S. Pat. No. 4,660,718, inventors Kato et al., which issued Apr. 28, 1987, and which is incorporated herein by reference, there is disclosed a runner bar-less fastener assembly comprising fasteners of the type comprising a flexible filament having a head at one end thereof and a cross-bar at the opposite end thereof, wherein the respective heads and cross-bars of adjacent fasteners are oriented in a parallel, side-by-side, spaced relationship. More specifically, the two side faces of each head are formed so as to protrude or bulge from edges towards a central portion to provide an apex, and adjacent heads are mutually and directly connected through their facing apices in a manner capable of being easily disconnected by cutting. The sides of adjacent cross-bars are connected by a film or a rod that extends longitudinally along a substantial portion of the length of the cross-bars or by a plurality of connectors posts that extend transversely relative to the sides of adjacent cross-bars. As explained in the foregoing '718 patent, the purpose of the aforementioned film, rod and connector posts is to prevent adjacent cross-bars from moving, i.e., pivoting, relative to one another.

In U.S. Reissue Pat. No. 32,332, inventor Kato, which reissued Jan. 20, 1987, there is disclosed a runner bar-less fastener assembly comprising fasteners of the type comprising a flexible filament having a head at one end thereof and a cross-bar at the opposite end thereof, wherein the respective heads and cross-bars of adjacent fasteners are oriented in a parallel, side-by-side, spaced relationship. More specifically, the two side faces of each head are formed so as to protrude or bulge from edges towards a central portion to provide an apex, and adjacent heads are mutually and directly connected through their facing apices in a manner capable of being easily disconnected by cutting. Likewise, the two side faces of each cross-bar are formed so as to protrude at a central portion, and adjacent cross-bars are directly connected through their respective protruding portions. In another embodiment, the aforementioned directly-conjoined heads are replaced with a second set of cross-bars that are directly conjoined in the same manner as described above. According to the foregoing '332 patent, the direct conjoining of adjacent heads to one another and the direct conjoining of adjacent cross-bars to one another, both in the manner described above, is preferable to the use of connector posts for the reason that, when severed, connector posts are said to leave unwanted whisker-like projections on the heads and/or cross-bars to which they are attached.

SUMMARY OF THE INVENTION

It is an object of the present invention to provide a new fastener clip and method of making the same.

It is another object of the present invention to provide a fastener clip as described above that has a minimal number of parts, that is easy to manufacture and that is easy to use.

According to one aspect of the invention, there is provided a fastener clip comprising a first fastener, said first fastener comprising a flexible filament having a first enlarged end and a second enlarged end, a second fastener, said second fastener comprising a flexible filament having a first enlarged end and a second enlarged end, said first fastener and said second fastener being arranged in a parallel, side-by-side, spaced relationship, a first connector post connecting said first enlarged end of said first fastener to said first enlarged end of said second fastener, a second connector post connecting said second enlarged end of said first fastener to said second enlarged end of said second fastener, an elongated runner bar spaced apart from the first enlarged ends of said first and second fasteners, a first connective neck connecting said elongated runner bar to the first enlarged end of said first fastener, said first connective neck having a first end which is formed onto the first enlarged end of said first fastener, and a second connective neck connecting said elongated runner bar to the first enlarged end of said second fastener, said second connective neck having a first end which is formed onto the first enlarged end of said second fastener.

According to another aspect of the invention, there is provided a fastener clip assembly comprising a plurality of fastener clips, a sheet having a front surface, at least a portion of the front surface of said sheet being coated with an adhesive, said plurality of fastener clips being mounted onto the front surface of said sheet in a spaced apart relationship, and a container for holding said sheet, said container comprising a top panel having an opening formed therein to provide access to the interior of said container.

According to another aspect of the invention, there is provided a method of making a fastener clip, said method comprising the steps of comprising a providing a mold having an impression resembling a fastener clip which comprises a first fastener, said first fastener comprising a flexible filament having a first enlarged end and a second enlarged end, a second fastener, said second fastener comprising a flexible filament having a first enlarged end and a second enlarged end, said first fastener and said second fastener being arranged in a parallel, side-by-side, spaced relationship, a first connector post connecting said first enlarged end of said first fastener to said first enlarged end of said second fastener, and a second connector post connecting said second enlarged end of said first fastener to said second enlarged end of said second fastener, injecting molten plastic into the impression in the mold, allowing the molten plastic to cool within the impression in the mold, and removing the molded plastic from the mold to yield the fastener clip.

According to another aspect of the invention, there is provided a method of making a fastener clip, said method comprising the steps of comprising a providing a mold having an impression resembling a fastener clip which comprises a first fastener, said first fastener comprising a flexible filament having a first enlarged end and a second enlarged end, a second fastener, said second fastener comprising a flexible filament having a first enlarged end and a second enlarged end, said first fastener and said second fastener being arranged in a parallel, side-by-side, spaced relationship, a first connector post connecting said first enlarged end of said first fastener to said first enlarged end of said second fastener, a second connector post connecting said second enlarged end of said first fastener to said second enlarged end of said second fastener, an elongated runner bar spaced apart from the first enlarged ends of said first and second fasteners, a first connective neck connecting said elongated runner bar to the first enlarged end of said first fastener, said first connective neck having a first end which is formed onto the first enlarged end of said first fastener, and a second connective neck connecting said elongated runner bar to the first enlarged end of said second fastener, said second connective neck having a first end which is formed onto the first enlarged end of said second fastener, injecting molten plastic into the impression in the mold, allowing the molten plastic to cool within the impression in the mold, and removing the molded plastic from the mold to yield the fastener clip.

Various other features and advantages will appear from the description to follow. In the description, reference is made to the accompanying drawings which form a part thereof, and in which is shown by way of illustration, various embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts.

DETAILED DESCRIPTION OF THE PREFERRED EMBODIMENT

Figure 1:
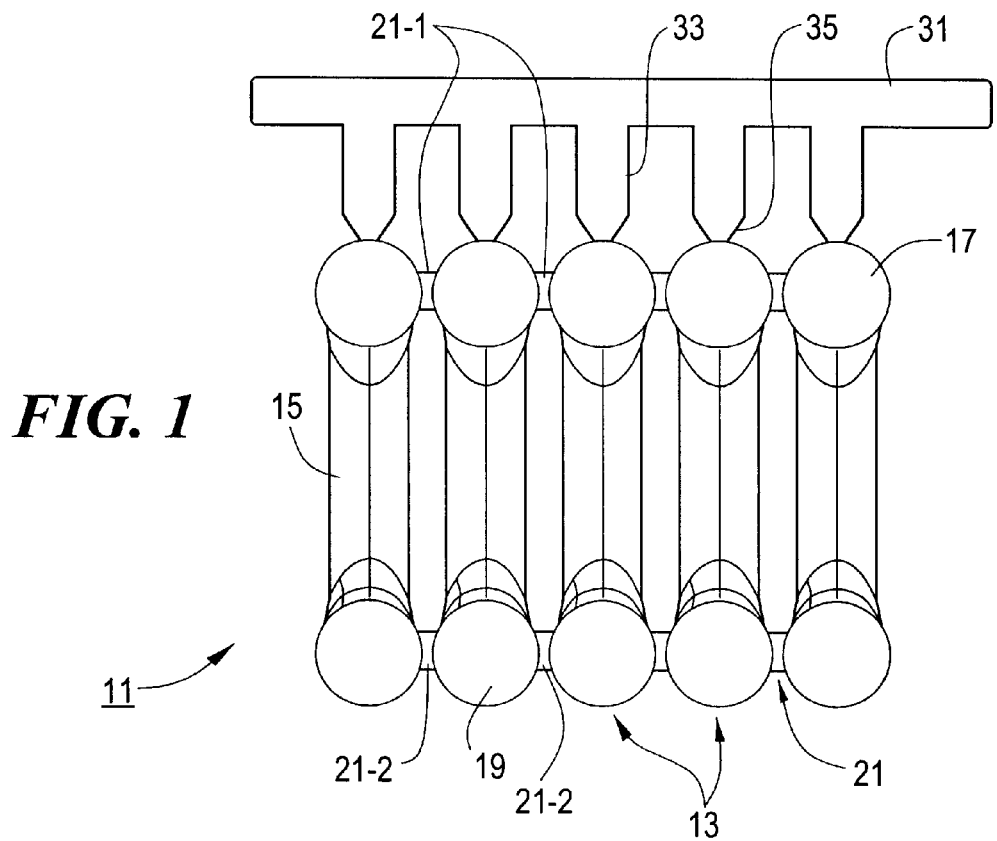
FIG. 1 is a top view of a first embodiment of a clip of fasteners constructed according to the teachings of the present invention.

Referring now to the drawings, there is shown a first embodiment of a fastener clip constructed according to the teachings of the present invention, said fastener clip being represented generally by reference numeral 11.

Fastener clip 11 is a unitary structure preferably injection molded from a plastic, such as polyurethane, polypropylene or the like, as will be described further in detail below. Fastener clip 11 is shown comprising five identical fasteners 13; however, it is to be understood that the number of fasteners 13 in fastener clip 11 is illustrative only and could be increased or decreased without departing from the scope or spirit of the present invention. (In fact, fastener clip 11 may, if desired, comprise upwards of several hundred or more fasteners 13.)

Each fastener 13 comprises a thin, elongated, flexible filament 15 having a first enlarged end 17 and a second enlarged end 19. In the present embodiment, filament 15 is substantially cylindrical in shape, enlarged end 17 is in the shape of a substantially cylindrical transverse bar, and enlarged end 19 is in the shape of a substantially cylindrical transverse bar, thereby giving fastener 13 a generally H-shaped configuration.

It should be understood that, although each of filament 15 and enlarged ends 17 and 19 is shown in the present embodiment having a generally cylindrical shape, filament 15 and enlarged ends 17 and 19 need not be generally cylindrical in shape. For example, enlarged ends 17 and 19 may be transverse bars having any of a number of different transverse cross-sectional shapes, such as ovaloid or rectangular. In addition, enlarged ends 17 and 19 may be transverse bars having a non-uniform shape, such as that possessed by cross-bars 55 and 57 of commonly-assigned, pending U.S. patent application Ser. No. 09/151,650, which patent application is incorporated herein by reference, or that possessed by feet 15-1 and 15-2 of commonly-assigned U.S. Pat. No. 5,622,257, which patent is incorporated herein by reference. Moreover, as seen below, one or both of enlarged ends 17 and 19 need not be in the form of a transverse bar.

Fasteners 13 are arranged substantially parallel to and spaced apart from one another, with their respective enlarged ends 17 oriented side-by-side and their respective enlarged ends 19 oriented side-by-side. Each pair of adjacent enlarged ends 17 is joined together at the approximate midpoints of mutually-opposing sides thereof by a severable connector post 21-1, and each pair of adjacent enlarged ends 19 is joined together at the approximate midpoints of mutually-opposing sides thereof by a severable connector post 21-2, connector posts 21-1 and 21-2 extending transversely relative to enlarged ends 17 and 19, respectively.

Connector posts 21 are strong enough to maintain the connection between adjacent fasteners 13 in clip 11 prior to the dispensing of individual fasteners 13 from clip 11 and, yet, are weak enough to be severed by the conventional severing action of a fastener dispensing tool. At the same time, posts 21 have a certain degree of flexibility; consequently, because of the arrangement of posts 21 relative to ends 17 and 19, adjacent fasteners 13 in clip 11 are permitted to pivot relative to one another. This freedom to pivot is very useful where clip 11 is dispensed from a fastener dispensing tool having a curved feed track, such as that disclosed in U.S. Provisional Patent Application Ser. No. 60/122,557, which is incorporated herein by reference.

Fastener clip 11 further comprises an elongated runner bar 31 which is spaced apart from fasteners 13 and which extends parallel with connector posts 21. A plurality of spaced apart connective necks 33 extend perpendicularly out from runner bar 31. Each connective neck 33 comprises a first end 35 of reduced cross-sectional area in comparison with the remainder of connective neck 33, first end 35 being formed onto an associated enlarged end 17. More specifically, each connective neck 33 tapers into a V-shaped tip at first end 35, thereby creating a point of weakness in connective neck 33 at first end 35.

It should be noted that the implementation of elongated runner bar 31 enables fastener clip 11 to be used in conjunction with currently existing fastener dispensing tools which are well known and widely used in the art, which is highly desirable.

Figure 2:
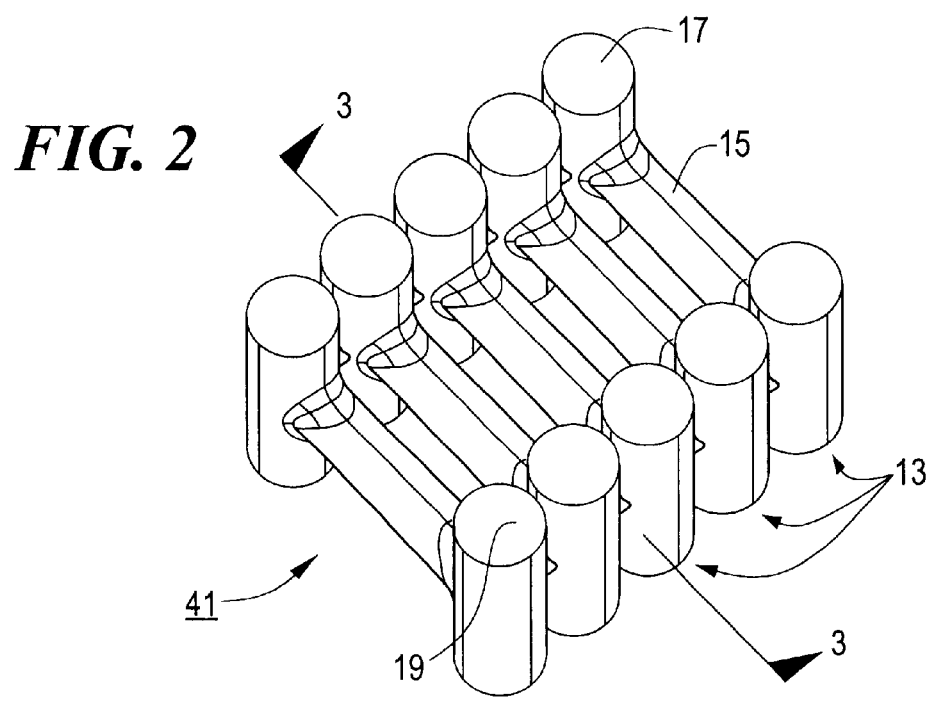
FIG. 2 is a top perspective view of a second embodiment of a clip of fasteners constructed according to the teachings of the present invention.
Figure 3:
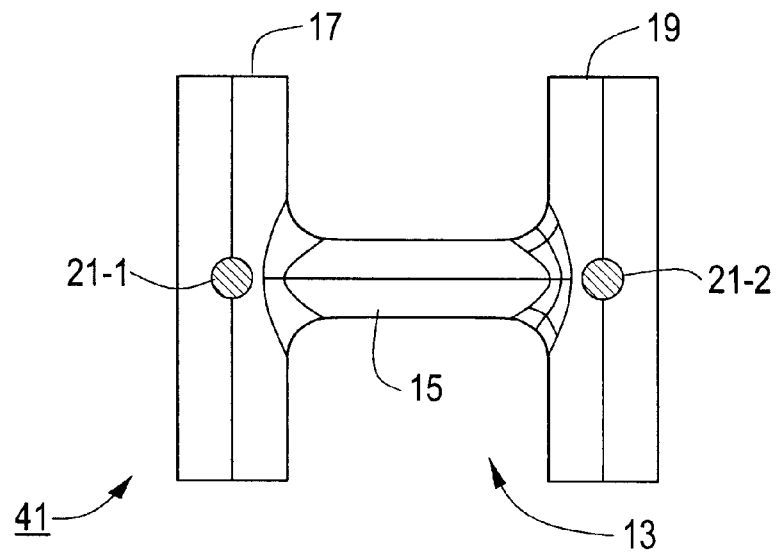
FIG. 3 is a front view of the clip of fasteners shown in FIG. 2, taken along lines 3—3.

Referring now to FIGS. 2 and 3, there is shown a second embodiment of a fastener clip constructed according to the teachings of the present invention, the fastener clip being represented generally by reference numeral 41. As will be described further in detail below, fastener clip 41 is a runner bar-less fastener clip.

Fastener clip 41 differs from fastener clip 11 only in that fastener clip 41 does not comprise runner bar 31 or plurality of connective necks 33.

It should be noted that fastener clip 41 can be constructed directly from fastener clip 11. Specifically, due to the reduced cross-sectional area of each connective neck 33 at first end 31, fasteners 13 can be easily separated from runner bar 31. As an example, a knife edge, or other similar device, can be applied across connective necks 33 at first end 31. Using a limited amount of downward force, the knife edge separates necks 33 and runner bar 31 from fasteners 13 at first end 35. Due to its V-shaped construction at first end 35, each connective neck 33 is designed to sever cleanly from its associated enlarged end 17 without leaving any significant remaining portion of connective neck 33 on enlarged end 17, which is highly desirable.

It should be noted that the runner bar-less construction of fastener clip 41 introduces advantages over fastener clips which include a runner bar. As a first example, fastener clip 41 is significantly smaller in size than fastener clips which include a runner bar. As a result, fastener clip 41 is relatively easy to package, handle and use, which is highly desirable. As a second example, because necks 33 and runner bar 31 are separated from fasteners 13 during the manufacturing process, necks 33 and runner bar 31 can be recycled to manufacture additional fastener clips 41, thereby decreasing the amount of economically and environmentally undesirable waste material.

Connector posts 21 in fastener clip 41 are shown as having a cross-section which is generally circular in shape; however, it is to be understood that connector posts 21 could have an alternatively-shaped cross-section, such as an ovaloid or rectangular cross-section, without departing from the spirit of the present invention. Also, connector posts 21 may be conical or tapered in cross-section. In fact, where fastener clip 41 is dispensed from a fastener dispensing tool like that disclosed in U.S. Provisional Patent Application Ser. No. 60/122,557, it may be highly desirable for connector posts 21 to have a conical or tapering transverse cross-section that decreases in diameter from the fastener about to be dispensed to its adjacent fastener so that very little of the severed connector post 21 that once connected the fastener about to be dispensed to the fastener previously attached to it will remain on the about-to-be-dispensed fastener. In this manner, the fastener about to be dispensed by the tool is able to sit substantially flush on the stage of the feed guide of said tool.

Figure 4:
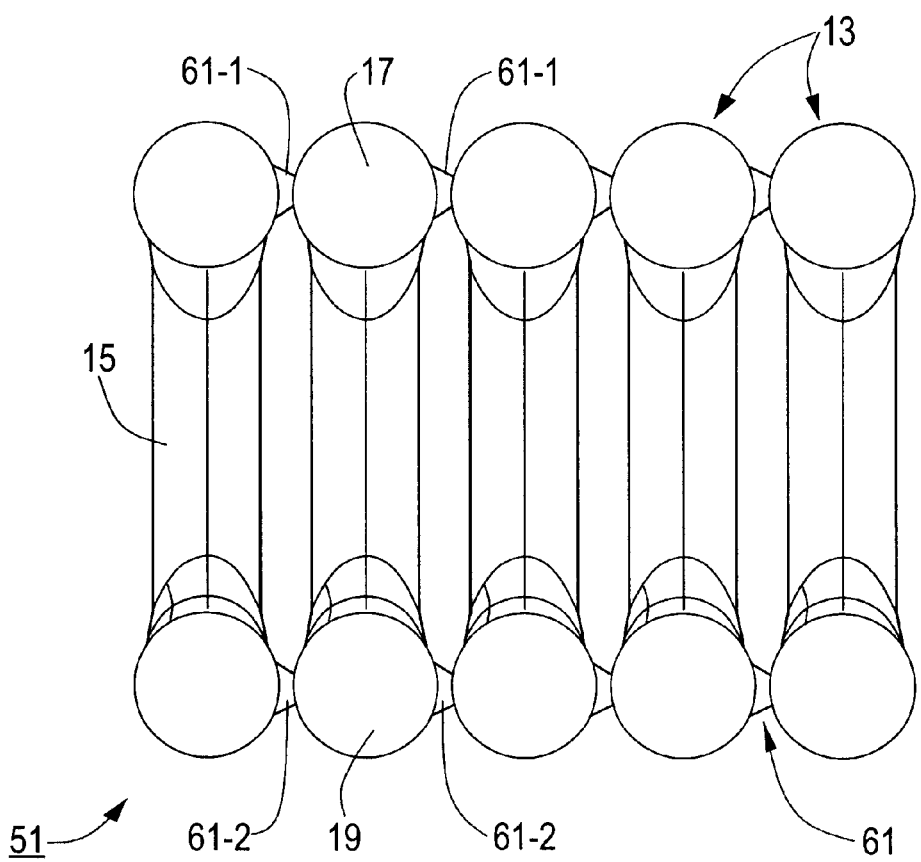
FIG. 4 is an enlarged top view of a third embodiment of a clip of fasteners constructed according to the teachings of the present invention.

An example of a fastener clip having connector posts that taper in diameter from one fastener to its adjacent fastener is shown in FIG. 4 and is represented generally by reference numeral 51. Clip 51 differs from clip 41 only in that its connector posts 61-1 and 61-2 taper in diameter from one fastener to its adjacent fastener.

The fasteners 13 of fastener clips 11, 41 and 51 may be used in a variety of applications. Where, for example, fasteners 13 are used to maintain an article of clothing, such as a dress shirt, in a folded condition, fasteners 13 preferably have the dimensions and tensile strengths specified in U.S. Ser. No. 09/151,650.

Figure 5:
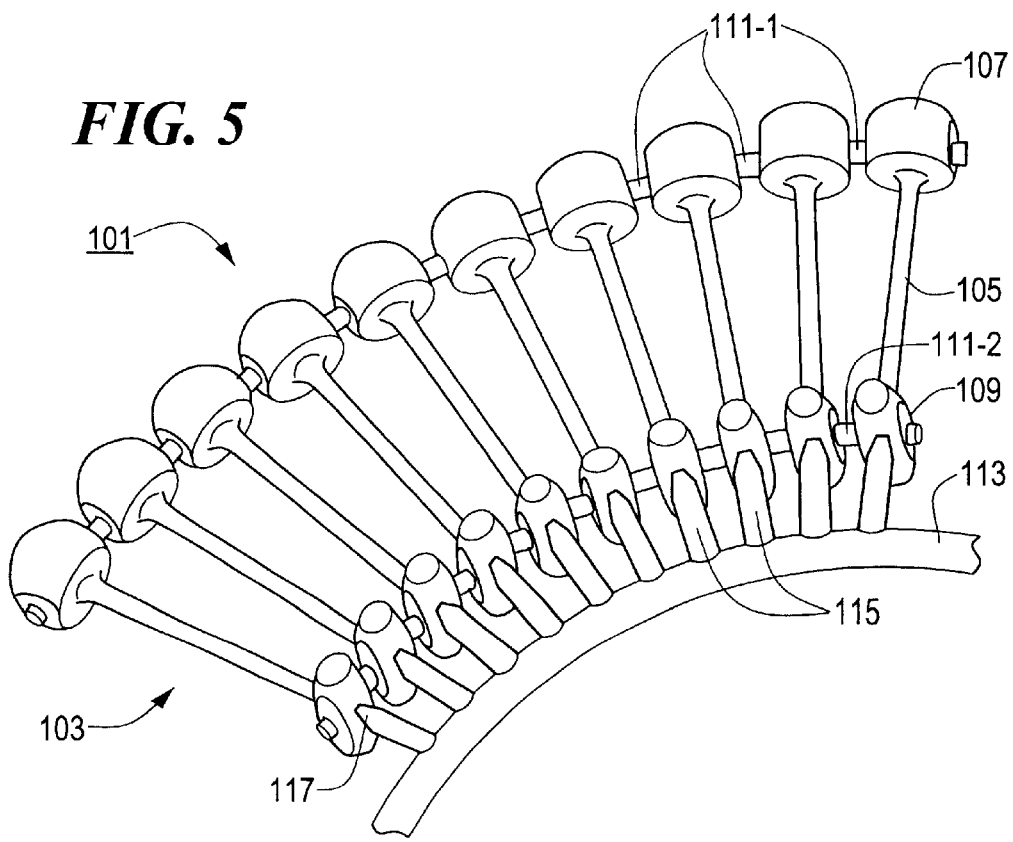
FIG. 5 is a perspective view of a fourth embodiment of a clip of fasteners constructed according to the teachings of the present invention.

Referring now to FIG. 5, there is shown a perspective view of a third embodiment of a fastener clip constructed according to the teachings of the present invention, said fastener clip being represented generally by reference numeral 101.

Figure 6A:
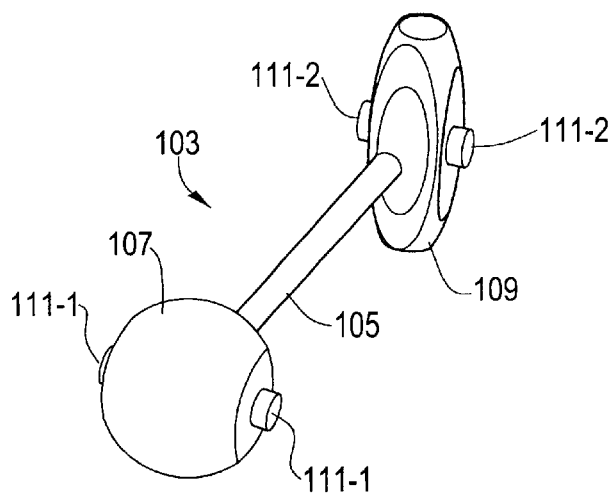
FIGS. 6(a) through 6(c) are enlarged fragmentary perspective views of the clip of fasteners shown in FIG. 5, showing an individual fastener and its associated connector posts.
Figure 6B:
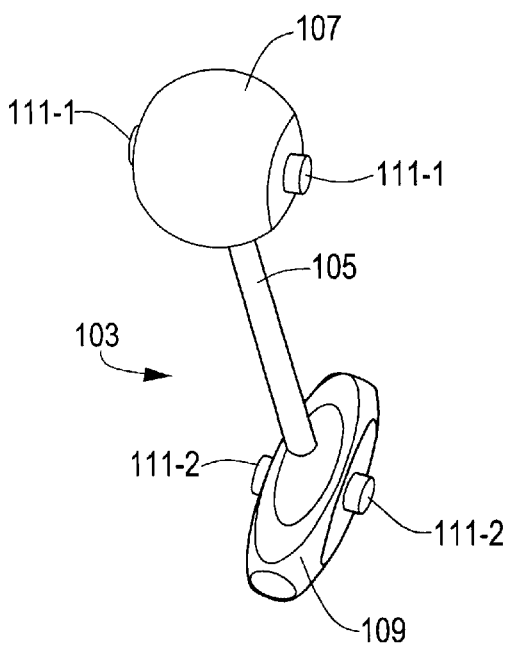
Figure 6C:
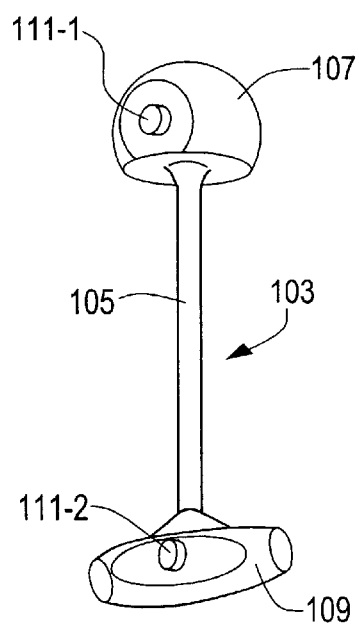

Clip 101 is similar in many respects to clip 11, the principal difference between the two clips being in the shape of their respective fasteners, clip 101 comprising a plurality of fasteners 103, each of fasteners 103 comprising a flexible filament 105 having a knob-shaped enlarged end 107, instead of a first substantially cylindrical transverse bar, and an enlarged end 109 similar to cross-bars 55 and 57 of U.S. Ser. No. 09/151,650, instead of a second substantially cylindrical transverse bar. Each pair of adjacent enlarged ends 107 is joined together at the approximate midpoints of mutually-opposing sides thereof by a severable connector post 111-1, and each pair of adjacent enlarged ends 109 is joined together at the approximate midpoints of mutually-opposing sides thereof by a severable connector post 111-2, connector posts 111-1 and 111-2 extending transversely relative to enlarged ends 107 and 109, respectively. Connector posts 111, which are shown in the present embodiment as being generally cylindrical, may have the variety of shapes described above in connection with connector posts 21. Connector posts 111 preferably have the strength and flexibility of connector posts 21. (Various enlarged fragmentary perspective views of clip 101 showing an individual fastener 103 and its associated connector posts 111-1 and 111-2 are shown in FIGS. 6(a) through 6(c).)

Fasteners 103 of clip 101 may be used, for example, to couple or to re-couple buttons to garments or fabrics; however, it is to be understood that fasteners 103 are not exclusively limited to this use and may be used in various other applications.

Fastener clip 101 further comprises an elongated runner bar 113 which is spaced apart from fasteners 103 and which extends parallel with connector posts 111. A plurality of spaced apart connective necks 115 extend perpendicularly out from runner bar 113. Each connective neck 115 comprises a first end 117 of reduced cross-sectional area in comparison with the remainder of connective neck 115, first end 117 being formed onto an associated enlarged end 109. More specifically, each connective neck 115 tapers into a V-shaped tip at first end 117, thereby creating a point of weakness in connective neck 115 at first end 117.

Figure 7:
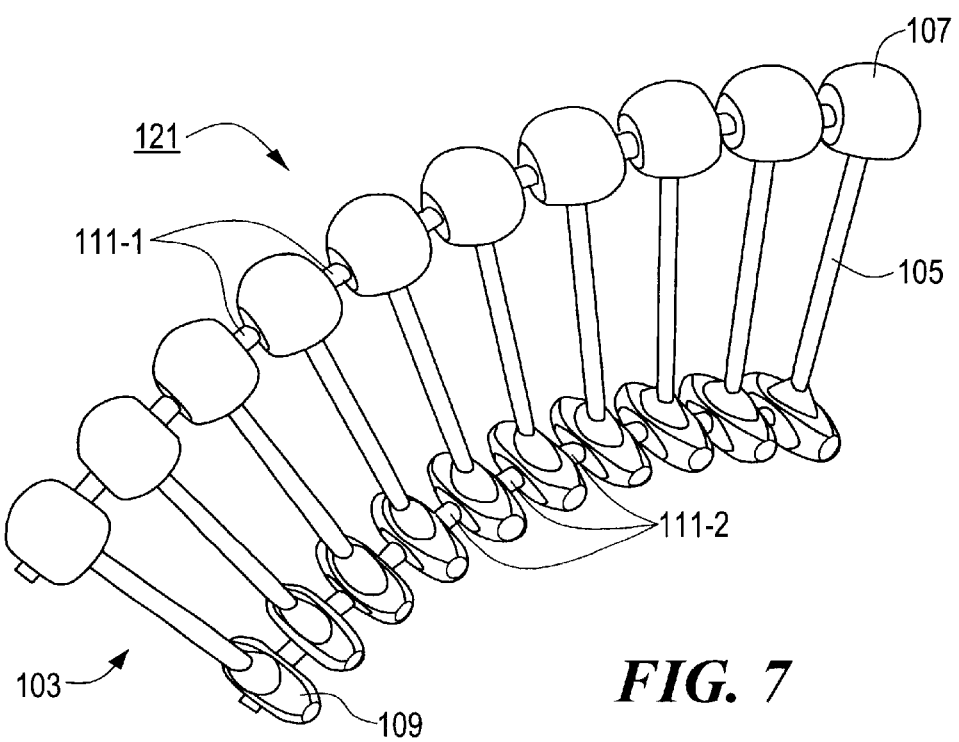
FIG. 7 is a perspective view of a fifth embodiment of a clip of fasteners constructed according to the teachings of the present invention.

Referring now to FIG. 7, there is shown a fourth embodiment of a fastener clip constructed according to the teachings of the present invention, the fastener clip being represented generally by reference numeral 121. As will be described further in detail below, fastener clip 121 is a runner bar-less fastener clip.

Fastener clip 121 differs from fastener clip 101 only in that fastener clip 121 does not comprise runner bar 113 or plurality of connective necks 117.

It should be noted that fastener clip 121 can be constructed directly from fastener clip 101. Specifically, due to the reduced cross-sectional thickness of each connective neck 115 at first end 117, fasteners 103 can be easily separated from runner bar 113. As an example, a knife edge, or other similar device, can be applied across connective necks 115 using a limited amount of force to separate necks 115 and runner bar 113 from fasteners 103 at first end 117. Due to its V-shaped construction at first end 117, each connective neck 115 is designed to sever cleanly from its associated enlarged end 109 without leaving any significant remaining portion of connective neck 115 on enlarged end 109, which is highly desirable.

It should be noted that the runner bar-less construction of fastener clip 121 introduces advantages over fastener clips which include a runner bar. For example, fastener clip 121 is significantly smaller in size than fastener clips which include a runner bar. As a result, fastener clip 121 is relatively easy to package, handle and use, which is highly desirable.

Fastener clips 11, 41, 101 and 121 are all preferably manufactured through the process of injection molding. For simplicity, the present discussion will be limited to the injection molding process for constructing fastener clip 11; however, it is to be understood that fastener clips 41, 101 and 121 could be similarly be constructed using the same injection molding technique without departing from the spirit of the present invention.

Figure 8:
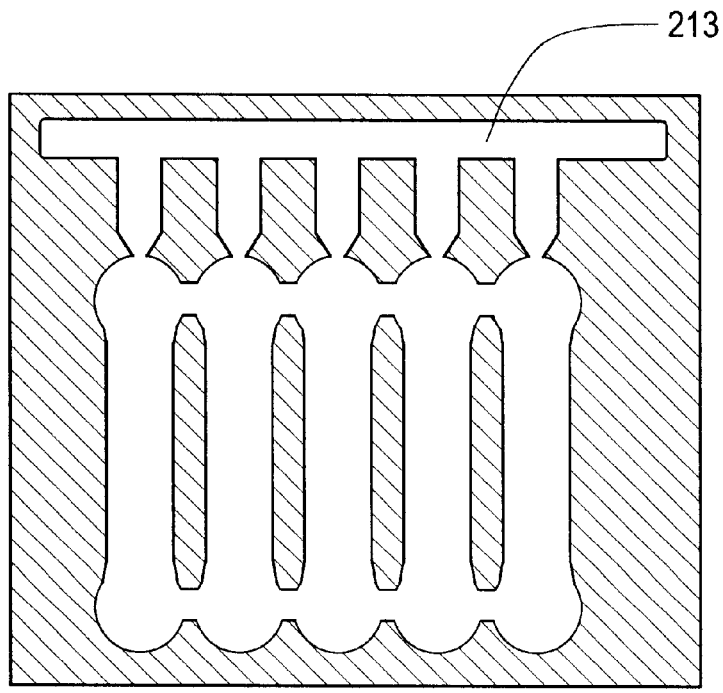
FIG. 8 is an enlarged section view of a mold adapted for use in making the clip of fasteners shown in FIG. 1.

Referring now to FIG. 8, there is shown an enlarged section view of a mold adapted for use in making fastener clip 11, the mold being constructed according to the teachings of the present invention and being represented by reference numeral 211.

As can be seen, mold 211 is shaped to include an impression 213 which corresponds to the dimensions of fastener clip 11. Although not shown, mold 211 is also provided with an opening through which molten material may be dispensed into impression 213.

Although not shown, mold 211 is appropriately constructed to permit access to and removal of the hardened molded material formed in impression 213. Accordingly, mold 211 may comprise a pair of halves interconnected by a hinge or similar connecting structure.

In use, mold 211 may be used to construct fastener clip 11 in the following manner. Molten material, which is preferably a plastic, is injected into impression 213 of mold 211 via an opening (not shown) in mold 211. The molten material is then allowed to cool and harden in mold 211. Mold 211 is then opened and the hardened molded material, which is in the form of fastener clip 11, is removed therefrom. The aforementioned process can be repeated for a number of iterations to produce a plurality of fastener clips 11.

It should be noted that a plurality of fastener clips, such as fastener clip 11, may be molded together to form a continuous fastener clip. For example, a plurality of fastener clips may be continuously molded together through a process of index molding. Although not shown, it should be noted that mold 211 would need to be slightly modified to allow for index molding (such as by having a portion of impression 213 extend outside enclosed mold 211).

In the index molding process, molten material is injected into impression 213 of mold 211. The molten material is allowed to cool and harden in mold 211. Mold 211 is then opened and the majority of the hardened molded material, which is in the form of a first fastener clip, is removed therefrom. The process is then repeated with a portion of the first fastener clip, such as the elongated runner bar, left disposed within enclosed mold 211. Subsequently, during the injection molding process of a second fastener clip, molten material is injected into impression 213 of mold 211 and around the portion of the first fastener clip still disposed within mold 211. Once the molten material is allowed to cool, mold 211 is opened to yield a second fastener clip which is continuously molded onto the first fastener clip. The process can be repeated to construct a continuous supply of a fastener clips.

Figure 9:
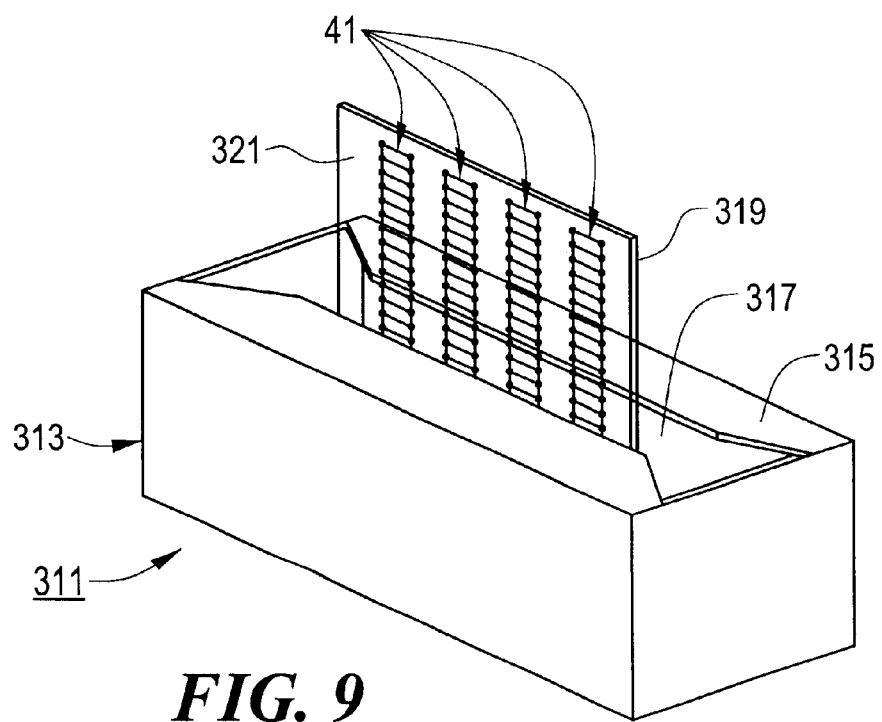
FIG. 9 is a fastener clip assembly constructed according to the teachings of the present invention.

Referring now to FIG. 9, there is shown a perspective view of a fastener clip assembly, the fastener clip assembly being constructed according to the teachings of the present invention and being represented by reference numeral 311.

Fastener clip assembly 311 comprises a partially enclosed container 313 constructed of a durable material, such as cardboard or paper. Container 313 is generally rectangular and comprises a top panel 315. A slot shaped opening 317 is formed in top panel 315 and provides access to the interior of container 313.

Fastener clip assembly 311 also comprises a sheet 319 having a front surface 321 which has an adhesive (not shown) formed on at least a portion thereof. A plurality of fastener clips 41 are mounted onto front surface 321 of sheet 319 in a spaced-apart relationship and are releasably secured thereto by the adhesive. As can be appreciated, by disposing multiple fastener clips 41 in a spaced-apart relationship on sheet 319, clips are prevented from becoming entangled and even potentially damaged.

It should be noted that although fastener clip assembly 311 is shown with plurality of fastener clips 41 mounted on sheet 319, it is to be understood that alternative fastener clips, such as fastener clips 11, 101 and 121, could be disposed on sheet 319 without departing from the spirit of the present invention.

It should also be noted that multiple partially-adhesive sheets 319 may be disposed within container 313 in order to provide a large quantity of fastener clips 41 for use. It should also be noted that sheets 319 may be layered in such a manner so that upon dispensing a first sheet 319 from container 313 a second sheet 319 would automatically extend partially out through opening 317.

The embodiments shown in the present invention are intended to be merely exemplary and those skilled in the art shall be able to make numerous variations and modifications to them without departing from the spirit of the present invention. All such variations and modifications are intended to be within the scope of the present invention as defined in the appended claims.

What is claimed is:

1. A fastener clip comprising:
   (a) a first fastener, said first fastener comprising a flexible filament having a first enlarged end and a second enlarged end;
   (b) a second fastener, said second fastener comprising a flexible filament having a first enlarged end and a second enlarged end;
   (c) said first fastener and said second fastener being arranged in a parallel, side-by-side, spaced relationship;
   (d) a first connector post connecting said first enlarged end of said first fastener to said first enlarged end of said second fastener;
   (e) a second connector post connecting said second enlarged end of said first fastener to said second enlarged end of said second fastener;
   (f) an elongated runner bar spaced apart from the first enlarged ends of said first and second fasteners;
   (g) a first connective neck connecting said elongated runner bar to the first enlarged end of said first fastener, said first connective neck having a first end which is formed onto the first enlarged end of said first fastener; and
   (h) a second connective neck connecting said elongated runner bar to the first enlarged end of said second fastener, said second connective neck having a first end which is formed onto the first enlarged end of said second fastener.

2. The fastener clip as claimed in claim 1 wherein the first end of said first connective neck is reduced in cross-sectional area in comparison with the remainder of said first connective neck.

3. The fastener clip as claimed in claim 2 wherein the first end of said second connective neck is reduced in cross-sectional area in comparison with the remainder of said second connective neck.

4. The fastener clip as claimed in claim 3 wherein said first connective neck tapers into a V-shaped tip at its first end.

5. The fastener clip as claimed in claim 4 wherein said second connective neck tapers into a V-shaped tip at its first end.

6. The fastener clip as claimed in claim 1 wherein each of said first enlarged end of said first fastener and said first enlarged end of said second fastener is a transverse bar.

7. The fastener clip as claimed in claim 6 wherein each of said second enlarged end of said first fastener and said second enlarged end of said second fastener is a transverse bar.

8. The fastener clip as claimed in claim 1 wherein each of said first enlarged end of said first fastener, said second enlarged end of said first fastener, said first enlarged end of said second fastener, and said second enlarged end of said second fastener is a substantially cylindrical transverse bar.

9. The fastener clip as claimed in claim 8 wherein each of said first connector post and said second connector post is generally circular in cross-section.

10. The fastener clip as claimed in claim 1 wherein said fastener clip is a unitary structure made of molded plastic.

11. The fastener clip as claimed in claim 1 wherein said flexible filament of each of said first fastener and said second fastener is substantially cylindrical.

12. The fastener clip as claimed in claim 1 wherein said first connector post extends transversely relative to the lengths of said first enlarged end of said first fastener and said first enlarged end of said second fastener and wherein said first connector post connects said first enlarged end of said first fastener to said first enlarged end of said second fastener at the approximate midpoints thereof.

13. The fastener clip as claimed in claim 12 wherein said second connector post extends transversely relative to the lengths of said second enlarged end of said first fastener and said second enlarged end of said second fastener and wherein said second connector post connects said second enlarged end of said first fastener to said second enlarged end of said second fastener at the approximate midpoints thereof.

14. The fastener clip as claimed in claim 1 wherein each of said first connector post and said second connector post is generally circular in cross-section.

15. The fastener clip as claimed in claim 1 wherein said first connector post tapers in cross-section from said first fastener to said second fastener.

16. The fastener clip as claimed in claim 15 wherein said second connector post tapers in cross-section from said first fastener to said second fastener.

17. The fastener clip as claimed in claim 1 wherein said first connector post is substantially cylindrical.

18. The fastener clip as claimed in claim 17 wherein said second connector post is substantially cylindrical.

19. A fastener clip assembly comprising:
(a) a plurality of fastener clips, wherein each of said plurality of fastener clips comprises,
  (i) a first fastener, said first fastener comprising a flexible filament having a first enlarged end and a second enlarged end;
  (ii) a second fastener, said second fastener comprising a flexible filament having a first enlarged end and a second enlarged end;
  (iii) said first fastener and said second fastener being arranged in a parallel, side-by-side, spaced relationship;
  (iv) a first connector post connecting said first enlarged end of said first fastener to said first enlarged end of said second fastener; and
  (v) a second connector post connecting said second enlarged end of said first fastener to said second enlarged end of said second fastener,
(b) a sheet having a front surface, at least a portion of the front surface of said sheet being coated with an adhesive, said plurality of fastener clips being mounted onto the front surface of said sheet in a spaced apart relationship, and
(c) a container for holding said sheet, said container comprising a top panel having an opening formed therein to provide access to the interior of said container.

20. The fastener clip assembly as claimed in claim 19 wherein said container is manufactured out of cardboard.

* * * * *